Figure 1:
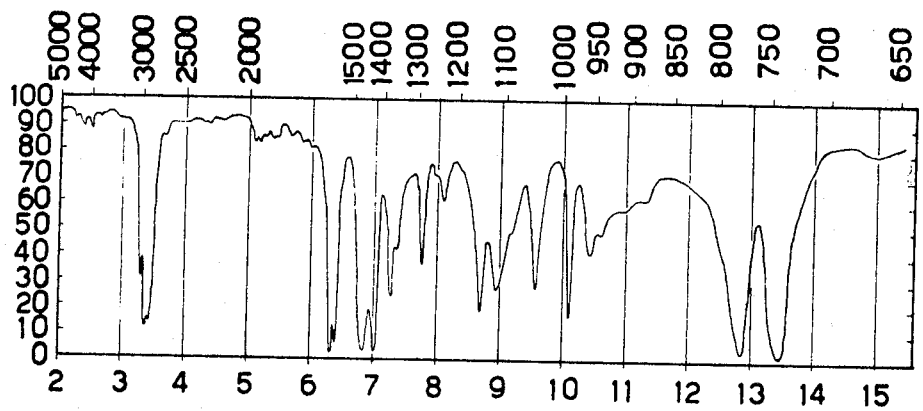

United States Patent Office 3,208,983
Patented Sept. 28, 1965

3,208,983
ISOPROPENYLPYRIDINE POLYMERS HAVING A HIGH STERIC REGULARITY AND A HIGH SOFTENING TEMPERATURE AND METHOD FOR PREPARING SAME
Giulio Natta, Giorgio Mazzanti, Paolo Longi, and Carlo Sempio, all of Milan, Italy, assignors to Montecatini Società Generale per l'Industria Mineraria e Chimica, a corporation of Italy
Filed July 17, 1961, Ser. No. 124,652
Claims priority, application Italy, July 19, 1960, 12,774/60
16 Claims. (Cl. 260—88.3)

The present invention relates to high molecular weight linear polymers of isopropenylpyridines having a very regular structure and a high softening temperature, and to a process for preparing the same.

In a copending U.S. patent application Serial No. 38,580/60, filed on June 24, 1960, there is claimed a process for preparing vinylpyridine polymers consisting of head-to-tail linear macromolecules having, at least for long portions thereof, a regular steric structure. More particularly, this patent teaches that from 2-vinylpyridine it is possible to obtain crystalline polymers which, as compared to amorphous polyvinylpyridines obtained using common free radical type initiators, presented better mechanical and thermal characteristics, so that such crystalline polymers are very useful in the field of plastics and of textile fibres. The catalysts employed for promoting the polymerization of vinylpyridines consists of metallorganic or metalloamidic compounds of metals belonging to the first 3 groups of the Periodic Table. Such catalyst compounds act as polymerization initiators with a coordinated anionic mechanism. The high regularity of the growth process of the single macromolecules in instances permits the formation of crystallizable polymers. Stereospecific anionic polymerization of vinylpyridine monomers had not been known prior to this U.S. patent application.

Heretofore, copolymers of isopropenylpyridines corresponding to the general formula

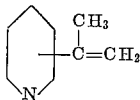

and more particularly, copolymers of 2-isopropenylpyridine with another suitable monomer have been obtained using a catalyst of the free radical type. When the same type of catalyst, i.e., a free radical type catalyst is used in the homopolymerization of isopropenylpyridine, products that are liquid, semisolid, or in any event products having low softening points (lower than 100° C.) are obtained. Such polymer products are soluble in acetone. These polymers are not regular in structure and do not offer any practical interest because of their poor properties.

We have surprisingly found that isopropenylpyridine, particularly 2- and 4-isopropenylpyridine, can be easily polymerized to high molecular weight linear polymers having a high softening point, which polymers reveal by X-ray examination a high structural regularity, i.e., the presence of a highly stereo-regular structure. This result is obtained by using as a catalyst a metal compound wherein the metal is from Groups I–III of the Periodic Table, this catalyst selected from the following compounds:

(a) Metal alkyls, metal aryls, metal alkylhydrides, and metal alkylhalides, wherein the metal is from Group II of the Periodic Table, and particularly wherein the metal is Mg or Be, (b) Metal alkyls and metal aryls wherein the metal is from Group I of the Mendeleeff Periodic Table, (c) Metal hydrides wherein the metal is from Groups I–III of the Mendeleeff Periodic Table, (d) And compounds of metals from Groups I–III of the Mendeleeff Periodic Table wherein the metal is bonded to a nitrogen atom which in turn is bonded to an organic group.

We have found the following compounds particularly suitable for polymerizing 2- and 4-isopropenylpyridine: diethyl amino magnesium bromide, phenyl magnesium bromide, n-butyl lithium, beryllium diethyl, magnesium diethyl, N-carbamyl lithium, beryllium-bis-(dimethylamine), phenylmethylamino magnesium bromide, tris (dimethylamino) aluminum, aluminum lithium hydride, and complexes of the type $LiAl[N(C_6H_5)_2]_3H$ and $LiAl[N(C_6H_5)_2]_3H.O(C_2H_5)_2$ which complexes can be prepared by a method described in the copending U.S. patent application Serial No. 39,219/60, filed on June 28, 1960.

The polymerization according to the present invention is preferably carried out at temperatures of from about 0 and 100° C. and in the absence of air and moisture. If desired, polymerization can be carried out in the presence of anhydrous solvents such as aliphatic or aromatic hydrocarbons.

The polymers obtained can be purified from the catalyst residues therein contained, e.g., by dissolution in diluted acid and precipitation in ammonia medium.

Figure 2:
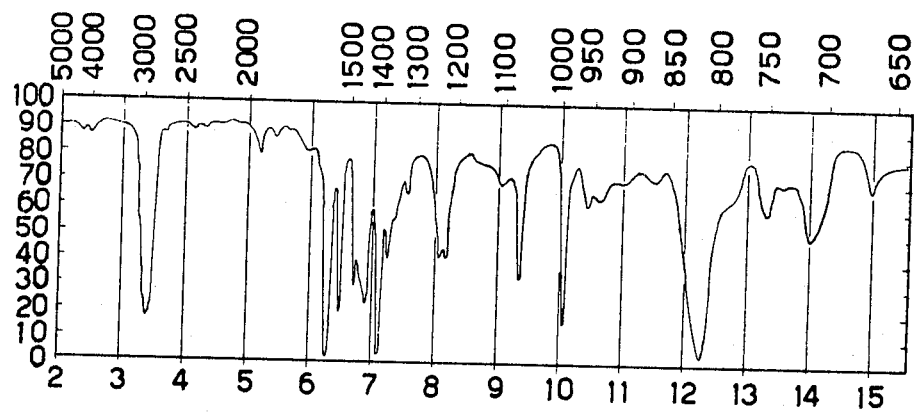

After drying, powdery white products having softening temperatures between about 190 and 240° C. are obtained. These products do not decompose appreciably at these temperatures. The polymers are insoluble in aliphatic hydrocarbons and in boiling ethyl or isopropyl ether. They are, however, radially soluble in chlorinated aromatic hydrocarbons or in alcohols. Particularly good results are obtained when 2- and 4-isopropenylpyridine are polymerized in accordance with our invention. The linearity and regularity of structure are also confirmed by the infra-red spectra reported in FIG. 1 (poly-2-isopropenylpyridine) and FIG. 2 (poly-4-isopropenylpyridine).

Polymers of 4-isopropenylpyridine are completely insoluble in acetone, even at its boiling point.

In contrast, polymers of 2-isopropenylpyridine are partially soluble in boiling acetone.

Polymers of 2- and 4-isopropenylpyridine prepared in accordance with our invention, with their consequent high softening temperatures and basic pyridinic nitrogen, offer considerable potential in the preparation, either alone or in admixture with difficultly dyeable polymeric materials such as polyolefins, of textile fibres, which fibres would present a high affinity to acid dyes or substantive wool dye. For instance, such isopropenylpyridine polymers can be mixed with alpha-olefin polymers (e.g., polypropylene) and the mixture can be extruded in the molten state to obtain textile fibres which, in spite of a low content of polyisopropenylpyridine (e.g., 2–15%), are easily dyeable. Compared with polyvinylpyridines which, as known, have equivalent application in the field of textile fibres, polymers of isopropenylpyridine, due to a lower basicity of the pyridinic nitrogen atoms, exhibit a lower solubility in acid dyeing baths. Accordingly, textile fibres having the same receptivity to acid dyes can be prepared with a lower content of isopropenylpyridine polymer.

The following examples will illustrate the present invention without limiting its scope. All parts are by weight unless otherwise stated.

Example 1

0.35 g. of $(C_2H_5)_2NMgBr$ suspended in 20 cc. of anhydrous toluene are introduced under nitrogen into a 100-cc. flask provided with a dropping funnel, an agitator, and a thermostatic bath. The thermostatic bath is heated to 45° C. and, while continuously agitating, a solution of 10 g. of 2-isopropenylpyridine in 10 cc. of anhydrous toluene is slowly introduced. The mixture is agitated for 2 hours and is then poured into 200 cc. of 5% HCl. The aqueous solution is separated and 200 cc. of a solution containing 5% of $NH_3$ and 5% of $NH_4Cl$ are added to it. The polymer precipitates as white flocks, is extracted with benzene and, after concentration of the benzene solution to a small volume, is precipitated again by addition of n-heptane.

9.5 g. of 2-isopropenylpyridine polymer are obtained in the form of a white powder which powder is insoluble in ether or in aliphatic hydrocarbons, but which is soluble in aromatic or chlorinated hydrocarbons and also in alcohols. Upon heating the polymer in a capillary it begins to soften at about 190° C. The intrinsic viscosity, as determined in dimethylformamide at 30° C., is 0.1. The polymer is linear and presents a high regularity of chemical structure as indicated by the infrared spectrum reported in FIGURE 1. (The abscissae, lower portion, are wave lengths, microns. The abscissae, upper portion, are wave numbers, cm.$^{-1}$. The ordinate is the percent transmission.)

The poly (2-isopropenylpyridine) is used to prepare a mixture consisting, e.g., of 5% by weight of poly (2-isopropenylpyridine) and 95% by weight of isotactic polypropylene. This mixture is spun at a temperature of 220–240° C. and is stretched according to the usual techniques used for preparing oriented polypropylene fibres. There results textile fibres which, in addition to possessing the excellent mechanical characteristics of polypropylene fibres, also are easily dyed with acid dyes and/or substantive wool dye.

Example 2

By proceeding as in the preceding example but using as a catalyst 0.3 g. of $(C_6H_5)MgBr$, 9.6 g. of 2-isopropenylpyridine polymer are obtained. This polymer presents characteristics similar to those reported in Example 1 and has an intrinsic viscosity of 0.15.

Example 3

By proceeding as in Example 1 but using as a catalyst 0.15 g. of Li-n-$C_4H_9$, 9.6 g. of poly (2-isopropenylpyridine) are obtained. The polymer has characteristics similar to those reported in Example 1.

Example 4

10 g. of 4-isopropenylpyridine are polymerized using 0.35 g. of $(C_2H_5)_2NMgBr$ in an apparatus similar to that described in Example 1. 6.5 g. of a powdery white polymer are obtained. The polymer has a softening temperature of 220–230° C. The solubility characteristics of this polymer are similar to those of poly-(2-isopropenylpyridine), except that in acetone the poly-(4-isopropenylpyridine) is completely insoluble whereas a polymer of 2-isopropenylpyridine swells in acetone and is partially dissolved. X-ray examination shows the 4-isopropenylpyridine polymer to be highly ordered but nonetheless amorphous. The linearity and regularity in chemical structure are also conformed by the infrared spectrum reported in FIG. 2. (The upper abscissae is wave numbers, cm.$^{-1}$. The lower abscissae is wave length, in microns. The ordinate is percent transmission.) The intrinsic viscosity, determined in dimethylformamide at 30° C., is 0.12. This polymer, in admixture with isotactic polypropylene will also result in textile fibres presenting a good affinity for acid dyes.

Example 5

By proceeding as in Example 4 but using as a catalyst 0.2 g. of $(C_2H_5)_2Be$, 7 g. of 4-isopropenylpyridine polymer are obtained. The polymer has an intrinsic viscosity of 0.17.

Example 6

By proceeding as in Example 1, 10 g. of 2-isopropenylpyridine are polymerized in the presence of 0.8 g. of $LiAl[N(C_6H_5)_2]_3H.O(C_2H_5)_2$. The polymer obtained presents characteristics similar to those described in Example 1.

Example 7

By operating as described in Example 4, 10 g. of 4-isopropenylpyridine are polymerized using 0.5 g.

$$LiAl[N(C_2H_5)_2]_3H$$

The intrinsic viscosity of the resultant polymer is 0.11. The polymer obtained presents characteristics similar to those described in Example 4.

Any of the catalysts specifically enumerated herein as particularly suitable and not illustrated in the above examples can be substituted for any of the catalysts used in such examples and more or less equivalent results are obtained.

Variations can of course be made without departing from the spirit of our invention.

Having thus described our invention, what we desire to secure and claim by Letters Patent is:

1. A linear head-to-tail homopolymer of 4-isopropenylpyridine characterized by having a softening temperature of from about 200° C. to 240° C., and by being insoluble in boiling acetone, said polymer being produced according to claim 3.

2. A linear head-to-tail homopolymer of 2-isopropenylpyridine characterized by having a softening temperature of from about 190 C. to 220° C., and by being only partially soluble in boiling acetone, said polymer being produced according to claim 3.

3. A process for preparing a linear, head-to-tail homopolymer of an isopropenylpyridine selected from the group consisting of homopolymers of 2-isopropenylpyridine having a softening temperature of about 190° C. to 220° C., and homopolymers of 4-isopropenylpyridine having a softening temperature of about 200° C. to 240° C., which process comprises polymerizing the selected monomeric isopropenylpyridine at a temperature of from about 0° C. to 100° C., in an inert atmosphere, and in contact with a catalyst consisting of a metal compound wherein the metal is one beyonging to Groups I to III inclusive of the Mendeleef Periodic Table, said catalyst being selected from the group consisting of the following compounds:

diethyl amino magnesium bromide
phenyl magnesium bromide
n-butyl lithium
beryllium diethyl,
magnesium diethyl
N-carbamyl lithium
beryllium-bis-(dimethylamine)
phenylmethylamino magnesium bromide
$LiAl[N(C_6H_5)_2]_3H$
and
$LiAl[N(C_6H_5)_2]_3H.O(C_2H_5)_2$ 4. The process of claim 3, wherein the catalyst is diethylamine magnesium bromide.

5. The process of claim 3, wherein the catalyst is phenyl magnesium bromide.

6. The process of claim 3, wherein the catalyst is lithium n-butyl.

7. The process of claim 3, wherein the catalyst is beryllium diethyl.

8. The process of claim 3, wherein the catalyst is magnesium diethyl.

9. The process of claim 3, wherein the catalyst is lithium N-carbamyl.

10. The process of claim 3, wherein the catalyst is beryllium bis(dimethylamine).

11. The process of claim 3, wherein the catalyst is phenylmethylamino magnesium bromide.

12. The process of claim 3, wherein the catalyst is tri-(dimethylamino) aluminum.

13. The process of claim 3, wherein the catalyst is aluminum lithium hydride.

14. The process of claim 3, wherein the catalyst is LiAl[N(C$_6$H$_5$)$_2$]$_3$H.

15. The process of claim 3, wherein the catalyst is LiAl[N(C$_6$H$_5$)$_2$]$_3$H.O(C$_2$H$_5$)$_2$.

16. A composition suitable for being extruded into easily dyeable fibers and consisting essentially of a mixture of polypropylene consisting essentially of isotactic polypropylene and a linear, head-to-tail homopolymer of an isopropenylpyridine selected from the group consisting of homopolymers of 4-isopropenylpyridine characterized by having a softening temperature of from 200° C. to 240° C. and by being insoluble in boiling acetone, and homopolymers of 2-isopropenylpyridine characterized by having a softening temperature of about 190° C. to 220° C. by being only partially soluble in boiling acetone, said isopropenylpyridine homopolymers being produced according to claim 3.

References Cited by the Examiner

UNITED STATES PATENTS 2,846,427  8/58  Findlay _____ 260—94.9
2,861,902  11/58  Pritchard _____ 260—88.3

OTHER REFERENCES

Bachman et al.: J.A.C.S., vol. 70, 2381–84 (1948).

Miller et al.: Journal of Polymer Science, volume 55, pages 643–656 (1961).

Golding: Polymers and Resins (pages 22 and 548–550), D. Van Nostrand (1959).

Miller et al.: Journal of Polymer Science, vol. 44, pages 391–5 (1910).

Flory: Principles of Polymer Chemistry (page 237), Cornell (1959).

JOSEPH L. SCHOFER, *Primary Examiner.*

HAROLD N. BURSTEIN, JOSEPH R. LIBERMAN,
*Examiners.*